US005233750A

United States Patent [19]

Wolf et al.

[11] Patent Number: 5,233,750

[45] Date of Patent: Aug. 10, 1993

[54] CHAIN SAW HAVING A SPROCKET WHEEL COVER AND A BRAKE DEVICE INTEGRATED INTO THE COVER

[75] Inventors: Günter Wolf, Oppenweiler; Reinhold Fink, Fellbach, both of Fed. Rep. of Germany

[73] Assignee: Andreas Stihl, Waiblingen, Fed. Rep. of Germany

[21] Appl. No.: 901,176

[22] Filed: Jun. 19, 1992

[30] Foreign Application Priority Data

Jun. 21, 1991 [DE] Fed. Rep. of Germany ....... 4120875

[51] Int. Cl.[5] ...................... B23D 57/02; B23D 59/00; B27C 1/10

[52] U.S. Cl. ........................................ 30/382; 30/381; 30/475

[58] Field of Search ................. 30/381, 382, 383, 475, 30/384

[56] References Cited

U.S. PATENT DOCUMENTS 4,197,640 4/1980 Murray ................................ 30/382
4,370,810 2/1983 Schurr et al. .
4,594,780 6/1986 Schliemann et al. ................ 30/382
4,753,012 6/1988 Schurr .................................. 30/382
5,094,000 3/1992 Becht et al. ........................... 30/382

FOREIGN PATENT DOCUMENTS 2922573 12/1980 Fed. Rep. of Germany ........ 30/382

OTHER PUBLICATIONS

"G410AVS.G455AVS G410AVSH.G455AVSH Owner's Manual", Komatsu Zenoah, Jul. 1990, p. 59 and FIG. 4.

*Primary Examiner*—Frank T. Yost
*Assistant Examiner*—Paul M. Heyrana, Sr.
*Attorney, Agent, or Firm*—Walter Ottesen

[57] ABSTRACT

The invention is directed to a motor-driven chain saw having a housing and a guide bar extending forward of the housing. The guide bar is clamped between the housing and a sprocket wheel cover. A brake device having a trigger configured as a hand guard is mounted in the sprocket wheel cover. The sprocket wheel is brought to standstill by the brake device when the trigger is actuated. With the sprocket wheel cover assembled, the hand guard is disposed transversely in front of the upper handle of the chain saw. In order to obtain a reliable triggering of the brake device, for example, during kickback and for a manual triggering at all areas of the hand guard, the hand guard is supported in a second bearing on the housing of the chain saw when mounting the sprocket wheel cover. In this way, torques acting in a direction opposite to the actuation of the hand guard are substantially avoided which could otherwise occur because of bearing play.

12 Claims, 3 Drawing Sheets

CHAIN SAW HAVING A SPROCKET WHEEL COVER AND A BRAKE DEVICE INTEGRATED INTO THE COVER

FIELD OF THE INVENTION

The invention relates to a motor-driven chain saw having a housing and a guide bar extending forward of the housing. The guide bar is clamped between the housing and a sprocket wheel cover. A brake device having a trigger configured as a hand guard is mounted in the sprocket wheel cover. The sprocket wheel is brought to standstill by the brake device when the trigger is actuated. With the sprocket wheel cover assembled, the hand guard is disposed transversely in front of the upper handle of the chain saw.

BACKGROUND OF THE INVENTION

In a known motor-driven chain saw (Zenoah G 455 AVS), the brake device for bringing the saw chain to standstill when there is a kickback of the chain saw is mounted in the sprocket wheel cover. This affords the advantage that the brake device with its trigger configured as a hand guard can be preassembled as an assembly unit with the sprocket wheel cover. The hand guard has an L-shaped configuration and is pivotally journalled on the sprocket wheel cover with one of the two leg ends; whereas, the other leg extends transversely to the longitudinal axis of the chain saw forward of the upper handle. The hand guard can also move transversely to the pivot axis because of the necessary assembly play which occurs with the bearing of the hand guard on the sprocket wheel cover. This can lead to erroneous triggering of the brake device. In this context, it must also be considered that with a trigger force acting on the free end of the leg of the hand guard, this force not only effects a pivoting movement of the hand guard, but also leads to a twisting torque in the bearing because of the acting lever conditions. The bearing in the sprocket wheel cover is therefore correspondingly heavily loaded whereby, even after a short operating time, the bearing play increases which increases the danger of an erroneous triggering of the brake device or, in an extreme case this can lead to functional inoperability of the triggering mechanism.

SUMMARY OF THE INVENTION

It is an object of the invention to provide a motor-driven chain saw wherein the brake device is integrated into the sprocket wheel cover thereof and wherein the triggering hand guard is journalled in a bearing wherein the twisting torque is as small as possible while still retaining assembly advantages.

The motor-driven chain saw of the invention includes: a housing defining a longitudinal axis; a sprocket wheel cover mountable on the housing; a guide bar for guiding a saw chain driven by a sprocket wheel; the guide bar extending outwardly from the housing in the same direction as the longitudinal axis; the guide bar being mounted on the housing so as to be clamped between the housing and the sprocket wheel cover; a brake device mounted in the sprocket wheel cover and being actuable between an at-rest position wherein the sprocket wheel is free to rotate and a braking position wherein the brake device brings the sprocket wheel and the saw chain to standstill; first bearing means disposed in the sprocket wheel cover and defining a first pivot axis; a hand guard pivotally journalled in the first bearing means so as to be pivotable about the first pivot axis; the hand guard defining a trigger for actuating the brake device when the hand guard pivots about the pivot axis; and, second bearing means on the housing for receiving and pivotally journalling the hand guard so as to be pivotable about a second pivot axis when the sprocket wheel cover is mounted on the housing.

When the sprocket wheel cover is mounted, the hand guard is releasably supported in a second bearing so that no twisting torques can occur in the bearings transversely to the rotational axis. A triggering force acting on the hand guard therefore leads exclusively to a pivot movement of the hand guard about the rotational axis and therefore provides a reliable triggering of the brake device. The arrangement of a second bearing reduces the bearing load so that even after longer operating times, no increased bearing play occurs because of increased bearing wear. A functionally reliable triggering of the brake device is guaranteed over a long operating duration.

In another embodiment, the invention is provided in a top-handle machine having an upper handle aligned in the longitudinal direction of the chain saw. In this embodiment, the first bearing is provided on one longitudinal side of the handle and the second bearing is arranged on the other longitudinal side thereof.

Preferably, the second bearing is defined by a bearing opening provided in the housing of the chain saw into which a bearing pin of the hand guard releasably engages. It is advantageous to configure the bearing pin as one piece with the hand guard and the hand guard and the bearing pin being made, for example, of plastic.

In still another embodiment of the invention, an axial projection is provided on the second bearing on the side facing toward the handle. This projection acts as an aid during assembly and limits the longitudinal movement of the sprocket wheel cover with the hand guard during assembly. When striking the stop, the user knows that the sprocket wheel cover can now be seated transversely to the longitudinal direction of the motor-driven chain saw since the bearing pin of the hand guard is aligned to the bearing opening.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
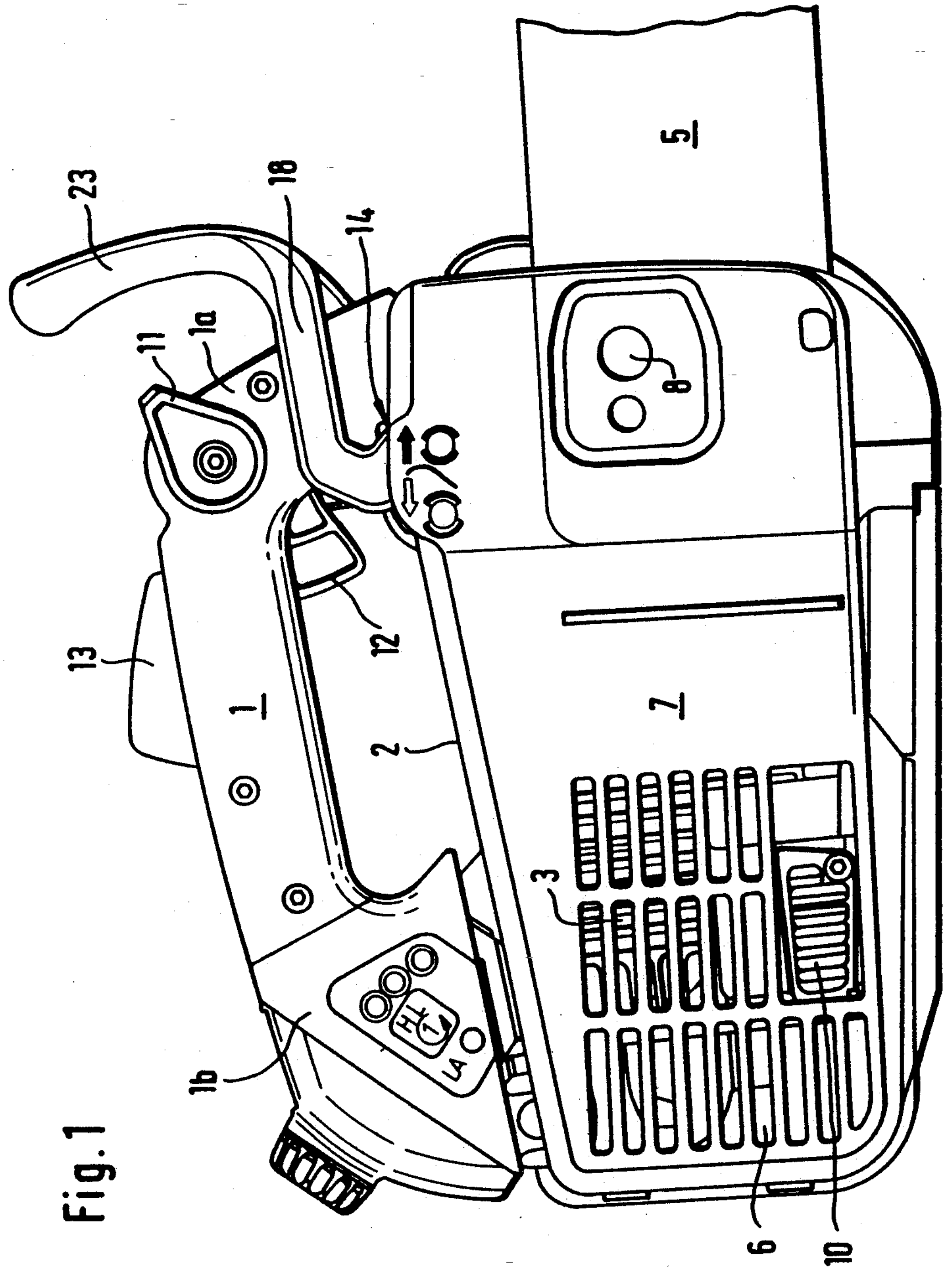
FIG. 1 is a side elevation view of a motor-driven chain saw having a hand guard pivotally mounted in the sprocket wheel cover.

The motor-driven chain saw shown in FIGS. 1 to 4 is a so-called top-handle chain saw which has only one handle 1 attached to the top wall of the housing and aligned in the longitudinal direction of the chain saw. The handle is preferably attached to the housing with anti-vibration elements interposed between the handle and housing. The handle 1 lies approximately in the middle above the motor-driven chain saw as seen in the plan view of FIG. 2.

The housing 2 of the chain saw has a forward portion (FIG. 3) defined by the crankcase 4 of an internal combustion engine 3 (FIG. 1) which is provided as the drive motor for the saw chain.

A guide bar 5 extends from the housing 2 of the chain saw in the longitudinal direction. A saw chain (not shown) runs along the periphery of the guide bar. The saw chain is driven by the engine 3 via a sprocket wheel with the sprocket wheel being covered by the sprocket wheel cover 7. The sprocket wheel cover 7 is mounted on one longitudinal side of the motor housing and completely covers this longitudinal side. The rear portion of the guide bar 5 is clamped between the sprocket wheel cover and the housing 2 of the chain saw (here the crankcase 4) in order to hold the guide bar securely to the chain saw. A stud bolt (not shown) for attaching the sprocket wheel cover 7 projects from the motor housing 2. The stud bolt lies perpendicular to the guide bar 5 and is guided through a corresponding opening 8 (FIG. 1) in the sprocket wheel cover 7. A nut now threadably engages a thread provided on the end of the stud bolt whereby the sprocket wheel cover 7 is attached to the housing 2 while tightly clamping the guide bar 5. The sprocket wheel cover 7 is connected to the housing so it cannot become separated therefrom.

As shown in FIG. 1, an air-outlet opening 6 is arranged in the rearward end of the sprocket wheel cover 7 facing away from the guide bar. The cooling air of the engine passes through this opening 6. The cooling air is drawn in by suction by a cooling-air fan arranged on the other longitudinal side of the engine. In addition, a further opening is provided on the sprocket wheel cover 7 for the exhaust-gas outlet opening of an exhaust-gas muffler 10.

The necessary operator-actuable elements and equipment for operating the engine are mounted in the handle 1. A position lever 11 for different operating states of the engine is mounted on the forward part 1*a* of the handle 1. A throttle lever 12 is journalled in the handle on the side thereof facing toward the housing 2. A throttle-lever lock 13 is provided for the throttle lever 12 and is mounted on the side of the handle 1 facing away from the housing.

Figure 2:
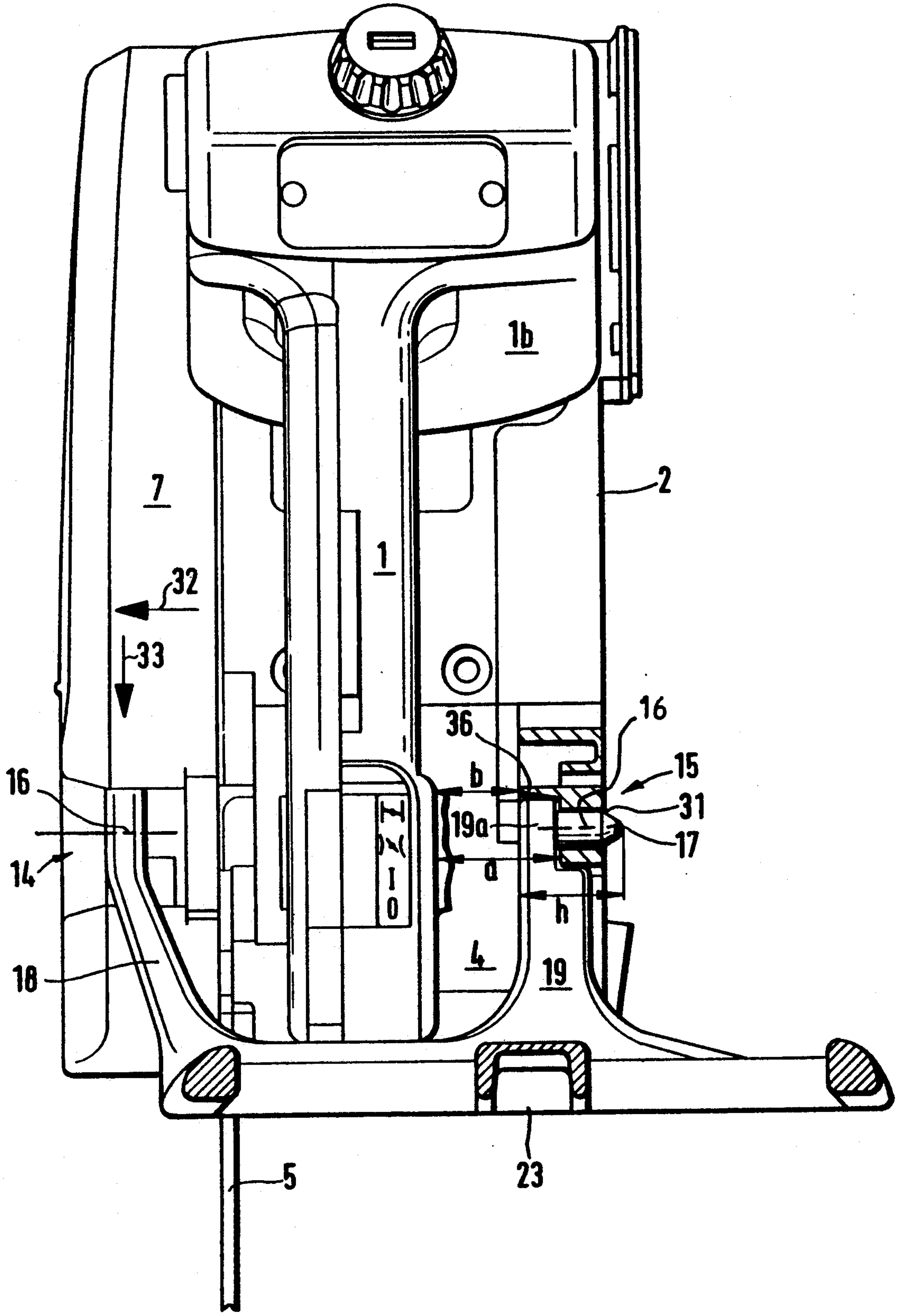
FIG. 2 is a plan view of the motor-driven chain saw of FIG. 1.

As shown in FIG. 2, the rearward portion 1*b* of the handle 1 is provided as a mounting space for the carburetor of the engine and also accommodates the intake-air filter for the combustion air.

A brake device 20 is mounted in the sprocket wheel cover 7 for bringing the running saw chain rapidly to standstill in the event of a kickback of the chain saw. The brake device 20 is shown in the section view of FIG. 4. The brake band 21 of the brake device 20 coacts with a brake drum (not shown) which is fixed to rotate with the sprocket wheel. When the brake device 20 is triggered, the brake band 21, is applied to the brake drum and brings the sprocket wheel to standstill so that the saw chain also is brought to standstill.

The brake device 20 is actuated via a trigger mechanism 22 (FIG. 4) with which a trigger in the form of hand guard 23 is associated. The trigger mechanism comprises essentially a toggle linkage 24 which braces a brake lever 25 which is spring loaded by a brake spring 26 in the direction toward the braking position. When the hand guard 23 moves in the direction of arrow 27, the first arm 28 of the toggle linkage 24 is taken along and is moved beyond its extended position. The toggle linkage 24 then folds so that the brake lever 25 is pivoted in the direction of arrow 29 under the action of brake spring 26 and the brake lever 25 then applies the brake band 21 to the brake drum.

For the assembled sprocket wheel cover 7 (FIGS. 1 and 2), the hand guard 23 lies transversely forward of the handle 1 aligned in the longitudinal direction as also shown in FIGS. 1 and 2.

The hand guard has two bearing flanges (18, 19) having respective free ends held in bearings (14, 15), respectively. The first bearing 14 is provided in the sprocket wheel cover 7; whereas, the second bearing 15 is provided on the housing of the chain saw and, in the embodiment shown, the second bearing 15 is formed on the crankcase 4 of the engine 3. The two bearings 14 and 15 advantageously have a common rotational axis 16 which, in the plan view of FIG. 2, lies between the two mounts of the handle 1 on the top side of the housing next to the forward portion 1*a* of the handle.

Figure 4:
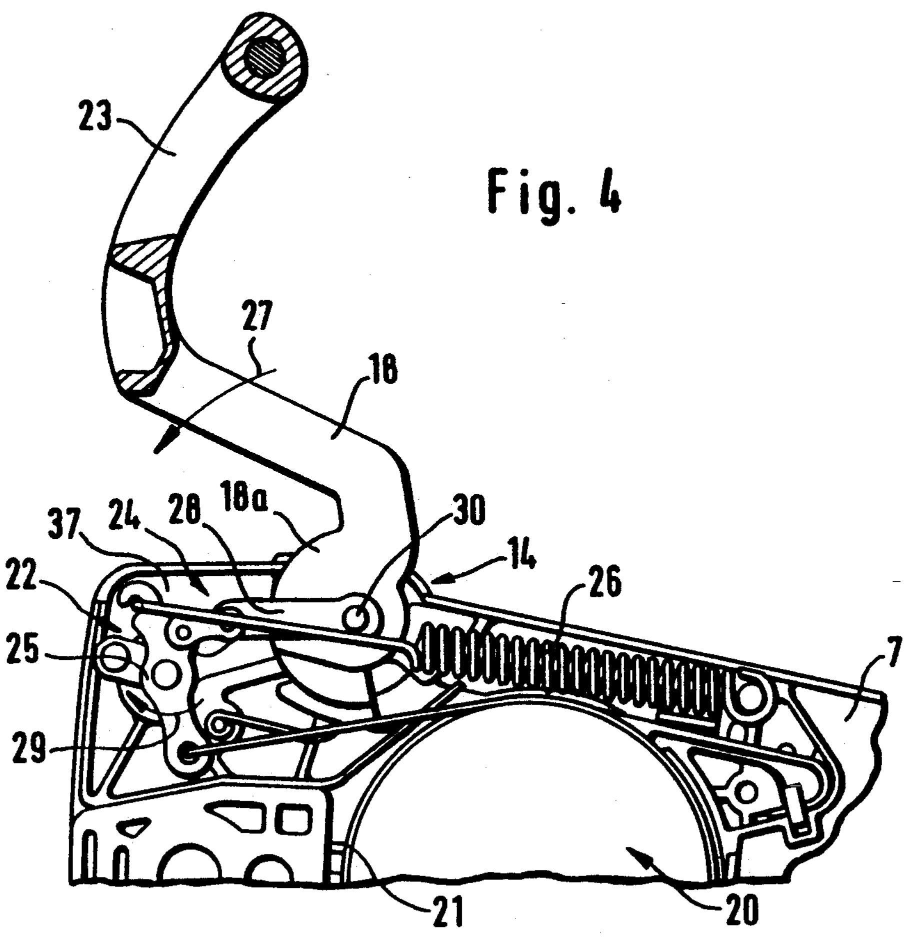
FIG. 4 is an inside view of the sprocket wheel cover having a brake device integrated into the sprocket wheel cover and a trigger mechanism.
Figure 3:
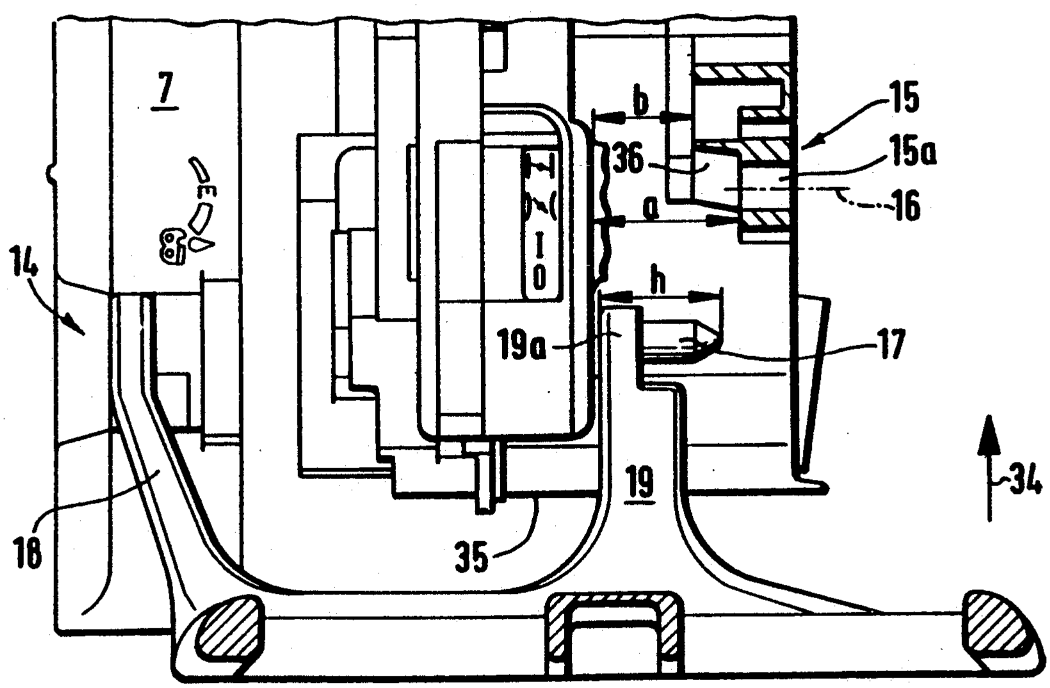
FIG. 3 is a portion of the plan view of FIG. 2.

The first bearing 14 is defined by a bearing pin 30 which is fixed in the sprocket wheel cover 7 and extends through the free end 18*a* of the bearing flange 18 (see FIG. 4). The bearing pin 30 is advantageously fixed on a modular plate 37 which is held in the sprocket wheel cover 7. The modular plate 37 preferably also acts as a carrier of the trigger mechanism 22.

The second bearing flange 19 is disposed at a spacing to the first bearing flange 18 transversely to the longitudinal axis of the chain saw. The second bearing flange 19 has a bearing pin 17 at its free end 19*a* which points toward the outer side of the chain saw on the side of the free end 19*a* facing away from the bearing flange 18. The bearing pin 17 is preferably configured as one piece with the hand guard 23 with the hand guard being made preferably of plastic. The bearing pin 17 is disposed in a bearing sleeve 31 defining the second bearing 15. The bearing sleeve 31 is seated in the housing of the chain saw.

As shown in FIG. 2, the bearing 14 is mounted on one side of the handle 1 whereas, the other bearing 15, is mounted on the other side of the handle 1. The two bearing flanges 18 and 19 of the hand guard 23 straddle the forward portion 1*a* of the handle 1 in a U-shaped manner.

The bearing 15 has a lateral spacing (a) from handle 1 transversely to the longitudinal direction of the chain saw. This spacing (a) is greater than the length (h) of the flange 19 with the bearing pin 17. The length (h) is measured transversely to the longitudinal direction of the chain saw. This ensures that the sprocket wheel cover 7 can first be lifted laterally in the direction of arrow 32 when removing the cover 7 from the chain saw. The pin 17 is then completely withdrawn from the bearing 15 because of the free spacing (a) provided between the bearing 15 and the handle 1. The sprocket wheel cover 7 can then be lifted off the chain saw in the direction of arrow 33.

Thus, the housing 2 of the chain saw with the engine 3 and the handle 1 conjointly define a first module. The sprocket wheel cover 7 together with the brake device 20, the bearing 14 and the hand guard 23 conjointly define a second module which can be conveniently mounted to the housing and disassembled therefrom.

It is advantageous that the bearing 15 has an axial projection 36 on its end face facing toward the handle 1. This projection 36 narrows the gap between the bearing 15 and the handle 1. The spacing (b) of the free end of the projection 36 from the handle 1 is then significantly less than the length (h) of the flange 19 including the bearing pin 17. The projection 36 advantageously extends over a portion of the periphery of the bearing 15 as a part circle. The opening of the part circle is disposed so as to face toward the end face 35 of the chain saw. If for the purpose of assembling the sprocket wheel cover, the bearing flange 19 with the bearing pin 17 is introduced between the handle 1 and the bearing 15, the bearing pin strikes against the projection 36 whereby the user knows that the bearing pin 17 is substantially aligned to the bearing opening 15*a*. The user then carries out the transverse movement still necessary for final assembly in a direction opposite to arrow 32 (FIG. 2) in order to then be able to fasten the sprocket wheel cover securely to the housing of the chain saw.

In a preferred embodiment, the projection 36 is configured so as to be tapered conically toward the bearing opening 15*a* thereby facilitating engagement of pin 17 in the bearing opening. A part circular-shaped configuration is not absolutely necessary as an aid for obtaining engagement. It is also adequate to provide a type of wall on the rearward portion of the end face of the bearing 15 referred to the assembly direction (arrow 34 in FIG. 3). This wall would then be beveled toward the bearing opening 15*a* to facilitate engagement of the pin 17.

It is understood that the foregoing description is that of the preferred embodiments of the invention and that various changes and modifications may be made thereto without departing from the spirit and scope of the invention as defined in the appended claims.

What is claimed is:

1. A motor-driven chain saw comprising:

a housing having a handle mounted thereon and defining a longitudinal axis;

said housing containing a motor assembly for driving a sprocket wheel and said housing with said motor assembly and said handle conjointly defining a first module;

a sprocket wheel cover mountable on said housing;

a guide bar for guiding a saw chain driven by said sprocket wheel;

said guide bar extending outwardly from said housing in the same direction as said longitudinal axis;

said guide bar being mounted on said housing so as to be clamped between said housing and said sprocket wheel cover;

a brake device mounted in said sprocket wheel cover and being actuable between an at-rest position wherein said sprocket wheel is free to rotate and a braking position wherein said brake device brings said sprocket wheel and said saw chain to standstill;

first bearing means disposed in said sprocket wheel cover and defining a first pivot axis;

a hand guard having first pivot means pivotally journalled in said first bearing means so as to be pivotable about said first pivot axis;

said hand guard defining a trigger for actuating said brake device when said hand guard pivots about said pivot axis;

said hand guard having second pivot means disposed in spaced relationship to said first pivot means;

said sprocket wheel cover together with said brake device, said first bearing means and said hand guard conjointly defining a second module;

second bearing means on said housing for receiving said second pivot means for pivotally journalling and releasably holding said hand guard so as to cause said hand guard to be pivotable about a second pivot axis when said second module is mounted on said first module and to facilitate disengaging said hand guard from second bearing means when said second module is disengaged from said first module; and, holding means for holding said second module on said first module after said second pivot means is received by said second bearing means.

2. The motor-driven chain saw of claim 1, said housing having first and second longitudinal sides; said handle being mounted on said housing between said first and second longitudinal sides; said first bearing means being part of said cover and disposed adjacent to said first longitudinal side; and, said second bearing means being disposed on said second longitudinal side.

3. The motor-driven chain saw of claim 2, said handle having a forward portion; and, said hand guard being a U-shaped hand guard having two legs defining respective bearing flanges straddling said forward portion of said handle.

4. The motor-driven chain saw of claim 1, said first and second pivot axes conjointly defining a common pivot axis.

5. The motor-driven chain saw of claim 1, said second bearing means including a bearing sleeve held in said housing and defining a bearing opening; and, said second pivot means being a bearing pin formed on said hand guard for engaging said bearing opening.

6. The motor-driven chain saw of claim 5, said bearing pin being formed as a single piece with said hand guard.

7. The motor-driven chain saw of claim 6, said bearing pin and said hand guard being made of plastic.

8. The motor-driven chain saw of claim 5, said hand guard having a bearing flange extending therefrom; said bearing flange defining a bearing opening; said first pivot means being conjointly defined by said bearing flange and said bearing opening; and, said first bearing means including a bearing pin fixedly mounted on said sprocket wheel cover and extending through said bearing opening formed in said bearing flange.

9. The motor-driven chain saw of claim 8, said sprocket wheel cover including a module plate mounted therein; and, said bearing pin of said first bearing means being fixedly mounted on said module plate.

10. The motor-driven chain saw of claim 5, said housing having first and second longitudinal sides; said chain saw further comprising a handle mounted on said housing between said first and second longitudinal sides; said first bearing means being disposed on said cover adjacent to said first longitudinal side and said second bearing means being disposed on said second longitudinal side; said bearing sleeve being disposed at a distance (a) from said handle measured transversely to said handle; said second pivot means of said hand guard including a flange extending therefrom; and, said pin and said flange conjointly defining a length (h) also measured transversely to said handle which is less than said distance (a).

11. The motor-driven chain saw of claim 10, said second bearing means including a mounting structure formed on said housing for holding said bearing sleeve; said mounting structure including a projection facing toward said handle for facilitating the engagement of said bearing pin in said bearing sleeve; and, said projection being spaced from said handle a distance (b) which is less than said length (h).

12. The motor-driven chain saw of claim 1, said motor assembly comprising an internal combustion engine having a crankcase; and, said housing including said crankcase and said second bearing means being supported by said crankcase.

* * * * *